Patented May 28, 1935

2,003,192

UNITED STATES PATENT OFFICE 2,003,192

METHOD OF PRODUCING MOISTURE-PROOF AND AIR TIGHT COATINGS

Wilhelm J. H. Hinrichs, Hamburg, and Hermann Wittkowski, Lockstedt-Niendorf, near Hamburg, Germany No Drawing. Application July 21, 1933, Serial No. 681,661. In Germany March 15, 1933

7 Claims. (Cl. 91—68)

This invention relates to a method of producing moisture-proof and airtight coatings.

It has been proposed previously to employ rubber latex for producing moisture-proof and airtight coatings. However, since satisfactory results could not be attained, various substances were added to the rubber latex, which however failed to satisfactorily solve the problem.

It has been found now that absolutely moisture-proof and airtight coatings of rubber latex can be produced on articles of commerce of numerous kinds and varieties, and if a rubber latex is used which has been completely freed from all hygroscopic constituents and also those which are liable to suffer decomposition, e. g., albuminous substances, said constituents as is well known, occurring naturally in rubber latex, and, furthermore, if the latex is concentrated as much as possible, as for example to about 60%. Rubber latex of this kind can be obtained for instance by repeatedly centrifuging it in rapidly rotating machines and by carefully washing out the concentrated portions thereof several times with ammoniacal water during centrifuging to eliminate the hygroscopic constituents and those other constituents that are liable to suffer decomposition.

The coating may be applied to the article in any known convenient manner, as for example by immersion of the said article in a highly concentrated latex, free of hygroscopic and decomposable constituents.

Goods packed in cases or wrapped in paper may, in this manner be provided with an airtight and moisture-proof coating, and this mode of coating can be applied also to eggs, sausages and other smoked goods as well as to foodstuffs and table luxuries in order to preserve them. This is of special importance for shipping foodstuffs and the like to and from hot regions, as refrigerator ships and refrigerator railroad-cars can be dispensed with. To remove harmful germs from the surface of objects, such as sausages and smoked foods, the articles can also be immersed in boiling water to which a preservative like boric or salicylic acid has been added prior to receiving the latex coating. Fragile objects like eggs are preferably inserted in frames and then dipped with the frames into a latex treated as herein described to produce the coating. Objects requiring individual coating are immersed by means of sieves and then permitted to drain the excess solution, or placed in superposed containers through which the latex solution flows.

To insure thorough coating a second coat or a plurality of coats may be put on after drying of the first coat in the same manner as the first coat. Moreover, the latex used for producing the coating may contain preservatives like boric or salicylic acid, or coloring matters, such as aniline dyestuff, and fillers like china clay.

Since dried latex coats, if firmly compressed, will stick together and combine, it is advisable to provide in coatings which must be free from such adhesive properties the layer of dried latex with a coat of cellulose ester varnish, such as a solution of acetyl cellulose ester and acetone. Furthermore, the latex coating on the outer surface can be cold vulcanized by being immersed in sulfur chloride, the excess of which is then evaporated by means of warm air or the like. Such subsequent treatment is especially advisable for goods kept in made-up packages as well as for materials that are to serve as wall-paper, labels, wood veneers, fabrics for making wearing-apparel, tents or the like.

We claim:—

1. A method of producing moisture-proof and airtight coatings on articles of commerce, including eggs, sausages, smoked articles, wallpaper, wood veneers, fabrics and the like, which consists in coating the said articles with a rubber latex, centrifugally highly concentrated and washed with ammonia solution, and which is completely freed from those hygroscopic and decomposable substances which are normal constituents of raw rubber latex.

2. A method of producing moisture-proof and airtight coatings on articles of commerce, which consists in providing the said articles to be protected with a plurality of coatings of rubber latex, centrifugally highly concentrated and washed with ammonia solution, and which is completely freed from those hygroscopic and decomposable substances which are normal constituents of raw rubber latex.

3. A method of producing moisture-proof and airtight coatings, on articles of commerce, which consists in coating the said articles to be protected with rubber latex which has been centrifugally highly concentrated and repeatedly washed with ammoniacal water, and thereby completely freed from the hygroscopic and decomposable natural constituents of rubber latex, and containing an added preservative.

4. A method of producing moisture-proof and airtight coatings, on articles of commerce, which consists in coating the said articles to be protected with highly concentrated latex completely freed from those hygroscopic and readily decomposable materials which are ordinarily present in normal rubber latex, and containing an added coloring agent.

5. A method of producing moisture-proof and airtight coatings on articles of commerce, which consists in coating the said articles to be protected with highly concentrated latex, completely freed from those constituents of natural rubber latex which are hygroscopic or decomposable, and containing a filler.

6. A method of producing moisture-proof and airtight coatings on articles of commerce, which consists in coating the said articles to be protected with highly concentrated latex completely freed from the hygroscopic and decomposable constituents normally present in rubber latex, and in applying to the coating a layer of cellulose ester.

7. A method of producing moisture-proof and airtight coatings on articles of commerce, which airtight coatings on articles of commerce, which consists in coating the said articles to be protected with highly concentrated latex completely freed from its hygroscopic and decomposable constituents, and in cold vulcanizing this coating on its outer limiting surface by means of sulfur chloride.

WILHELM J. H. HINRICHS.
HERMANN WITTKOWSKI.